June 3, 1930.  G. SCHLEICHER  1,762,081
BEATER
Filed Feb. 24, 1930
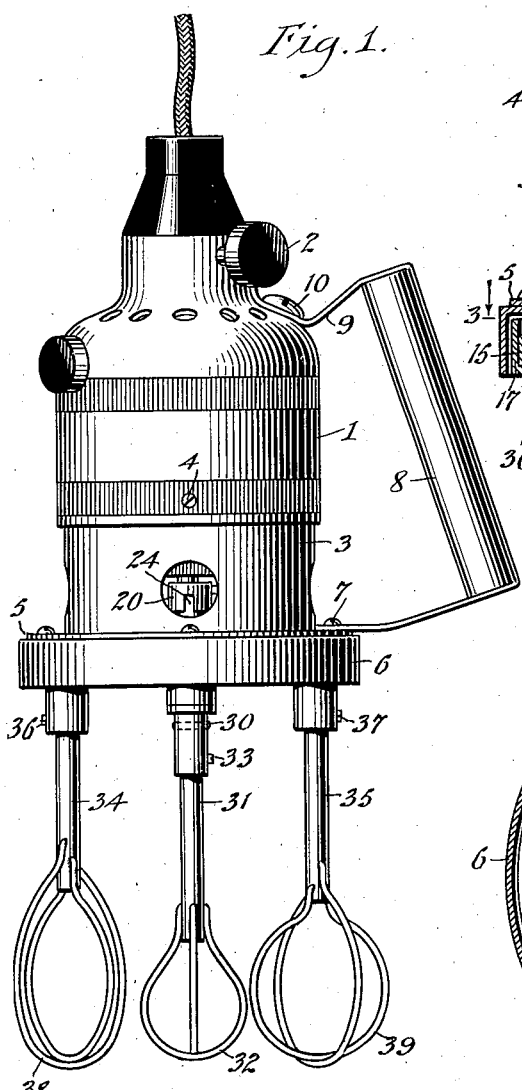
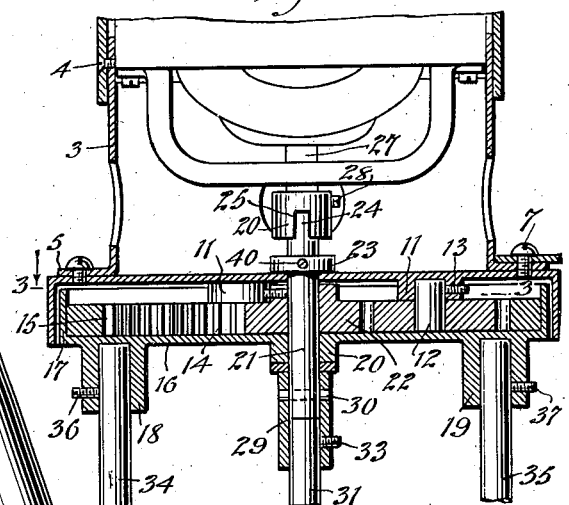
INVENTOR
G. Schleicher
BY
ATTORNEY Patented June 3, 1930

1,762,081

UNITED STATES PATENT OFFICE

GEORGE SCHLEICHER, OF NEW YORK, N. Y.

BEATER

Application filed February 24, 1930. Serial No. 430,827.

This invention relates to power driven beaters and particularly to an improved construction which may be used for beating or mixing various articles, and which may also be adjusted so as to be used for other purposes.

An object of the invention is to provide an improved construction which is substantially permanently connected with an electric motor, the formation being such that beaters, stirring devices and other rotating members may be connected therewith to utilize the power from the motor in many ways.

A further object of the invention, more specifically, is to provide a beater utilizing an electric motor and a form of planetary gearing, whereby the beaters or stirring members may be grouped so that certain members will move in a circle and others will rotate in situ.

In the accompanying drawing,—

Figure 1 is a side view of a beater disclosing an embodiment of the invention;

Figure 2 is a fragmentary vertical sectional view through part of the structure shown in Figure 1, said view illustrating the essential parts of the invention;

Figure 3 is a sectional view through Figure 2 on the line 3—3;

Figure 4 is a group of stirring members embodying certain features of the invention;

Figure 5 is a bottom plan view of the structure shown in Figure 1 but with the stirring members illustrated in Figure 4 applied thereto.

Referring to the accompanying drawing by numerals, 1 indicates an electric motor of any desired kind, as for instance, one of the motors now on the market provided with the usual starting button 2 which controls a switch turning on and off the current, the same being old and well-known. In order to connect in a desired and efficient manner certain moving parts to the motor, a sleeve 3 has been provided, said sleeve being connected to the casing of motor 1 in any desired manner, as for instance, by rivets or screws 4. The sleeve 3 is provided with an annular flange 5 to which the casing 6 is connected by suitable screws 7. One of the screws 7 extends through part of the handle 8 for securing the handle to flange 5. An extension 9 of handle 8 is secured by screw 10 to the casing of motor 1, whereby the entire apparatus may be moved about through the use of handle 8. The casing 6 is in the form of an inverted cup-shaped structure preferably formed of metal and also preferably provided with a number of hollow lugs 11. In the drawing there is illustrated three lugs 11, and in each lug there is provided a stub shaft 12 preferably held in place by set screw 13. On each stub shaft 12 is mounted a gear 14, and these gears, as shown in Figure 3, all continually mesh with an internal rack 15 rigidly secured in any desired manner to the plate 16. The plate 16 has an upstanding flange 17 which telescopes to a position within the casing 6, as shown in Figure 2. Plate 16 is provided with two hollow lugs 18 and 19 and a box 20 having an aperture extending therethrough, whereby the shaft 21 may extend through the box 20, through the driving gear 22, through an aperture in the casing 6 and through the collar 23. The upper end of the shaft 21 is provided with a reduced portion 24, as shown in Figure 2, and said reduced portion is adapted to fit into the notch or opening 25 of the clutch member 26 rigidly secured to the armature 27 by any suitable means, as for instance, set screw 28. At the lower end of shaft 21 there is mounted a sleeve 29, said sleeve being held in place by suitable pin 30 extending through the sleeve and through the shaft 21. This structure provides a socket for the standard 31 of the central beater 32. The standard 31 may be clamped in place by any suitable means, as for instance, set screw 33. Standards 34 and 35 fit into the sockets formed in the boxes 18 and 19, and these standards are clamped in place by suitable set screws 36 and 37. At the lower end the standards 34 and 35 are provided with beaters or beating members 38 and 39, as shown in Figure 1. Collar 23 is rigidly secured to shaft 21 by suitable set screw 40, whereby it acts as a support for holding the plate 16 and the parts carried thereby in the assembled relation illustrated in Figs. 2 and 3. When the parts are thus assembled power may be turned on and the beater 32 will rotate, while the beaters 38 and 39 will move in a circle, and consequently, efficiently beat eggs or other foods. The beaters 38 and 39 may be set in different positions by rotation, so that the arms of beater 32 will, to a certain extent, pass through the space between two of the arms of each of the beaters 38 and 39. By providing beaters which move in a circle and a central rotating beater, the eggs or other food being acted upon will have a tendency to move toward the center of the container during the beating operation. When heavier articles of food or other articles are to be mixed the mixing heads 41, 42 and 43 are used. It will be noted that the mixing heads 41 and 43 are each provided with a pointed section 44 and a finger section 45. When the pointed sections 44 are arranged, as shown in Figure 5, the material will be urged toward the center where it is beaten or thoroughly mixed by the head 42. In the drawing two forms of beaters or mixers have been shown, but it will be evident that other forms of beaters and mixers may be used, and in fact, many attachments could be connected either to the socket 29 or to the members 18, 19 and 29. In all forms of the invention the same idea is present of providing a portable electrically-driven structure which is easily held and shifted from one position to the other by reason of the handle 8.

What I claim is:—

1. A beater of the character described, comprising an electric motor, a sleeve extending from said motor, a cup-shaped casing connected with said sleeve, a plate having an annular upstanding flange coacting with said casing to produce an enclosure, a shaft extending through said casing and said plate, means for coupling said shaft with the driving part of said motor, a gear wheel rigidly secured to said shaft, a plurality of pinions continually meshing with said gear wheel, a stub shaft for each of said pinions, said stub shafts being rigidly connected with said casing, an internally-geared ring rigidly connected with said plate and continually meshing with said pinions, whereby when said motor is rotating the shaft coupled therewith will rotate in one direction, while said plate will rotate in the opposite direction, means for connecting a member to said shaft and a plurality of means for connecting other members rigidly to said plate.

2. A beater, including an electrically-driven motor, a plurality of beating members and means for actuating said beating members, said means comprising a driving shaft connected to one of said beating members, a plate rigidly secured to the other beating member, an internally-toothed gear ring secured to said plate, a plurality of fixed gears meshing with said gear ring, and a driving gear meshing with said plurality of gears, said driving gear being rigidly secured to said shaft.

3. In a beater of the character described, a plurality of beater members, an electric motor and means for connecting the electric motor with the beaters, said means including a casing connected to the stationary part of the electric motor, a rotating plate fitting within the casing, a gear ring connected to said plate, a plurality of pinions carried by said casing and continually meshing with said gear ring, a centrally-positioned gear meshing continually with said pinions, a shaft rigidly secured to said gear, and means for coupling said shaft with the rotating part of said motor.

4. In a device of the character described, an electric motor, a sleeve connected with the stationary part of the electric motor, a casing rigidly secured to said sleeve, said casing having a top plate and an annular depending flange, a rotating plate formed with an upstanding annular flange fitting within the flange of said casing, said plate having a pair of hollow boxes acting as socket members for receiving beating and stirring members, a gear ring secured to said plate within the upstanding flange thereof, a plurality of pinions coacting with said gear ring forming a planetary system for rotating said plate, a driving gear meshing with all of said pinions, said pinions being rotatably mounted on said casing, a shaft extending through said plate and rigidly secured to said driving gear for transmitting power thereto, means carried at one end of said shaft for supporting a beater member, and means coacting with the opposite end acting as a coupler for coupling the shaft with the rotating part of said motor.

Signed at New York city, in the county of New York and State of New York, this 14th day of February, A. D. 1930.

GEORGE SCHLEICHER.